US007967607B2

(12) United States Patent
Abraham et al.

(10) Patent No.: US 7,967,607 B2
(45) Date of Patent: Jun. 28, 2011

(54) COLOR, SHEEN AND/OR FINISH SELECTOR FOR COATINGS AND OTHER CHARACTERISTICS OF SURFACES

(75) Inventors: Ralph Abraham, Parma, OH (US); William Kachinski, North Olmsted, OH (US); Paul Rattigan, Chicago, IL (US); William Roblin, North Royalton, OH (US); Hall Dillon, Bay Village, OH (US)

(73) Assignee: Dorn Color, Inc., Cleveland, OH (US)

( * ) Notice: Subject to any disclaimer, the term of this patent is extended or adjusted under 35 U.S.C. 154(b) by 370 days.

(21) Appl. No.: 12/290,468

(22) Filed: Oct. 31, 2008

(65) Prior Publication Data

US 2009/0113832 A1 May 7, 2009

Related U.S. Application Data

(60) Provisional application No. 61/001,506, filed on Nov. 1, 2007.

(51) Int. Cl.
*G09B 25/00* (2006.01)

(52) U.S. Cl. .......................................................... 434/74

(58) Field of Classification Search .................... 434/72, 434/73, 74, 75, 78, 79, 81, 82, 97, 98, 365, 434/367, 382; 446/109, 478
See application file for complete search history.

(56) References Cited

U.S. PATENT DOCUMENTS

| | | | | |
|---|---|---|---|---|
| 1,478,425 | A * | 12/1923 | Dickinson | 434/74 |
| 2,259,435 | A * | 10/1941 | Collins | 434/74 |
| 2,339,044 | A * | 1/1944 | Barrett | 434/74 |
| 3,659,358 | A * | 5/1972 | Brown | 434/74 |
| 4,373,730 | A * | 2/1983 | Koltz | 273/155 |
| 5,228,857 | A * | 7/1993 | Roland | 434/74 |
| 6,790,042 | B2 * | 9/2004 | Worth | 434/75 |
| 6,976,328 | B1 * | 12/2005 | Goller | 40/124.01 |
| 7,156,663 | B1 * | 1/2007 | Gerhart | 434/74 |
| 2008/0014561 | A1 * | 1/2008 | Boney | 434/103 |

OTHER PUBLICATIONS http://apps.laticrete.com/VendorWeb/images/DS-666.0-1107.jpg; © 2005 Laticrete International, Inc.
http://www.custombuildingproducts.com/ProductCatalog/Grout/GroutColors.aspx?user=pro&lang=en; © Custom Bulding Products. Grout Color Selector displaying molded color black samples for ceramic tile and stone from Custom Building Products. © 2005 Custom Building Products.

* cited by examiner

*Primary Examiner* — Kurt Fernstrom
(74) *Attorney, Agent, or Firm* — D. Peter Hochberg; Sean F. Mellino; Daniel J. Smola

(57) ABSTRACT

A grout selector composed of a flat substrate, a coating on the substrate for simulating the color and/or finish of one of a plurality of grouts and fold lines for enabling the substrate to be folded and placed between adjacent bricks, tiles or other coverings to simulate the presence of grout.

22 Claims, 3 Drawing Sheets

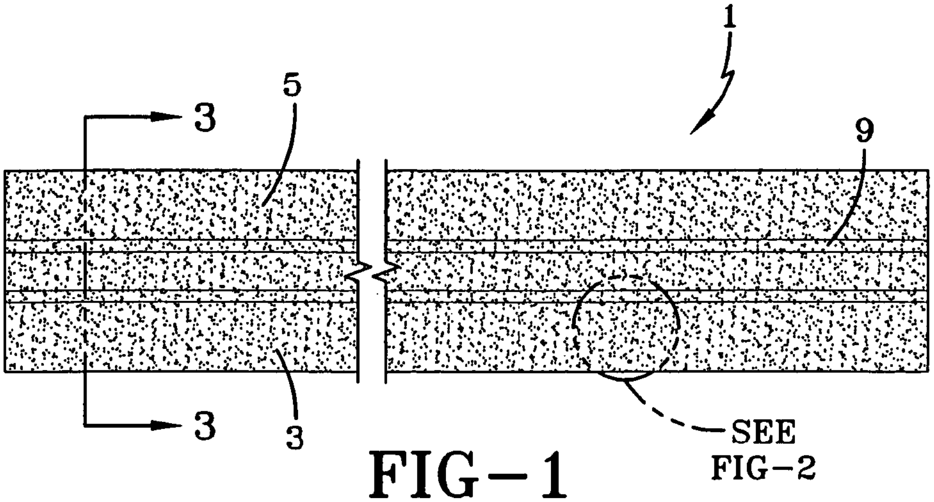
FIG−1
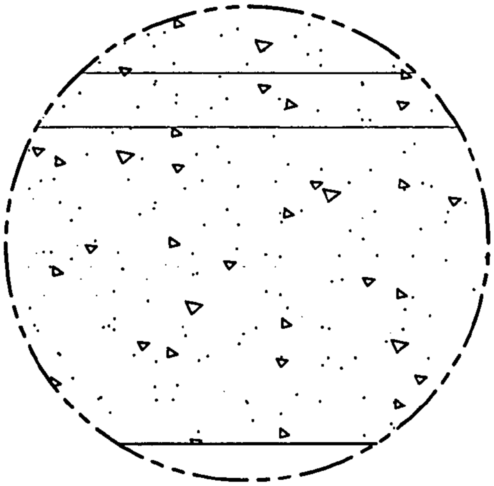
FIG−2
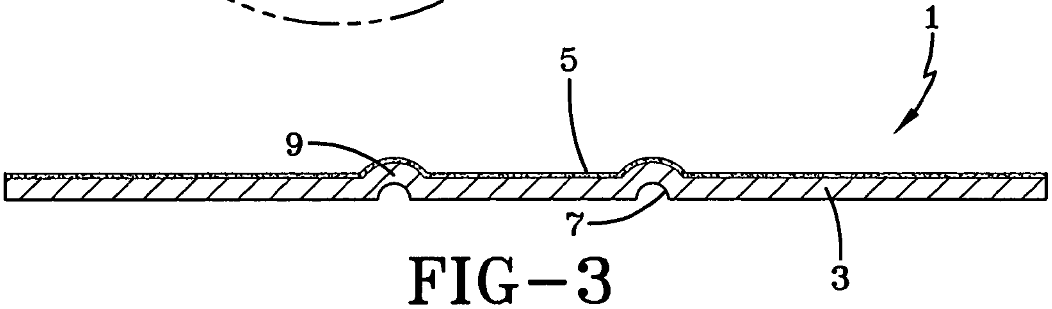
FIG−3
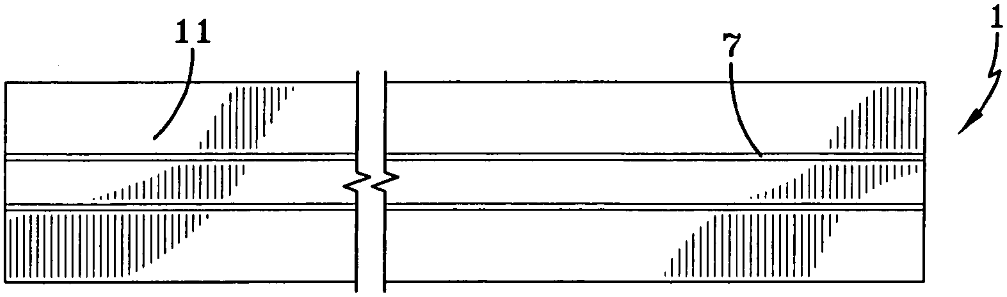
FIG−4

COLOR, SHEEN AND/OR FINISH SELECTOR FOR COATINGS AND OTHER CHARACTERISTICS OF SURFACES

CROSS-REFERENCE TO RELATED APPLICATION

This application claims priority of U.S. Provisional Application No. 61/001,506 filed Nov. 1, 2007, under Title 35, United States Code, Section 119(e), which is incorporated herein by reference in its entirety.

BACKGROUND OF THE INVENTION

1. Field of the Invention

The invention relates to color selectors, and in particular to a simple but effective device for selecting the color (as well as the sheen and finish) of coatings and other characteristics of surfaces, such surfaces including exposed grout and other mortar used for holding tiles, bricks, mosaics and the like to a support surface, or of coverings such as stucco for use on support surfaces.

2. Description of Prior Art

The color of grout for holding tile, brick, mosaics and the like ("the covering elements") is important cosmetically, since the exposed grout is readily apparent and can cover small or large areas, depending on the area the covering elements cover, the size of covering elements and the space between the covering elements where the grout is exposed and visible. The simplest way is to pick a color from a group of colors which the person feels is appropriate, but this is haphazard, and could as often as not lead to mistakes. There are large number of colors of grout currently available, and one conventional way for selecting color is by means of printed brochures, which are typically referred to as color cards, upon which are glued small strips of colors representative of the grout colors available from a particular company. These strips tend to be small, often from 2 to 3 inches, and cannot be laid between the covering elements. Therefore, the user can only imagine how the color would appear since the user cannot place the color card along a reasonable length of the covering elements. Color cards are relatively inexpensive and can be given to prospective customers, but are of limited usefulness due to their small size, and the inability to insert them between covering elements to see how they will look in use. Color cards are provided under the corporate names Laticrete (headquartered in Bethany, Conn.) and Mapei (headquartered in Milan, Italy) and Custom Building Products (headquartered in Seal Beach, Calif.) among others.

Another grout color selector according to the prior art are three sided plastic molded channels, which are essentially molded parallelepiped color plastic blocks having colors corresponding to different grout colors. The color blocks generally are arranged in an open box, and the user selects respective blocks, places the selected block between the covering elements, and determines whether the color of the block is appropriate. While the color blocks are more effective in use than color sheets, they do have serious limitations. For one, each set of blocks is fairly expensive—too expensive to give to each prospective customer. Each set, which may include 12-32 blocks, would cost at least several dollars per box. Typically, the grout suppliers have sets of blocks from one or more grout suppliers, but the ultimate purchaser rarely would be given a set of blocks due to the expense of a set of blocks. Another problem with the set of blocks as grout color selectors is that they are fairly short in length, and of fixed width. Being short in length means that they only indicate the appearance of the prospective grout color for a very limited area, leaving it to the user's or designer's imagination as to how the grout color would look for the full length of a pair of covering elements, or over a more extensive length of the prospective grout. A further problem with the grout blocks is that they do not show variations in texture that occur in grouts as used. Because of the cost, limited length, lack of texture variance found in grouts, blocks of material showing the various grout colors are of limited usefulness. Products for such color blocks are sold under the trademarks Tec® made by TEC of Arlington Heights, Ill., Auto-Color® made by Auto Color Co., Inc. of Marietta, Ga. and TexRite® made by Texas Cement Products, Inc. of Houston Tex. among others.

There is a need for inexpensive, three-dimensional color, sheen and/or finish selectors for the characteristics of various surfaces of many types of materials, such as mortar of all types, painted surfaces, material for covering surfaces such as stucco, various types of aggregates and smooth, non-aggregate surfaces.

SUMMARY OF THE INVENTION

It is an object of the present invention to provide an inexpensive yet effective color, sheen and/or finish selector for grout and other mortars.

It is another object of the invention to provide a color, sheen and/or finish selector for grout and other mortars which extends for comparatively longer lengths of covering elements than commercial grout color selectors presently available.

A still further object of the present invention is the provision of a grout color, sheen and/or finish selector where the product can be either manufactured in different widths, or provision can be made for making the widths adjustable to take into consideration variations in distances between covering elements placed on support surfaces.

It is still another object of the present invention to provide a grout color, sheen and/or finish selector which approximates the color, sheen and/or finish of grout at least as accurately as conventional grout color selectors in a less expensive manner.

An additional object of the provision of grout color, sheen and/or finish selectors which are inexpensive enough to enable dealers to give them to potential customers without charge.

Another object is to provide a grout color, sheen and/or finish selector which can inexpensively be shipped in quantity.

It is also an object to provide a grout color, sheen and/or finish selector which can be made and shaped as a flat, inexpensive product, and which can manually be configured to simulate different grout sizes in three dimensions.

Additionally it is an object to provide an inexpensive grout color, sheen and/or finish selector which accurately provides grout color samples with respect to chroma, hue and value of the respective grout colors, and with respect to the sheen and finish of the samples.

A general object is to provide a selector which is in three dimensions when in use, for selecting the color, sheen and/or finish of a surface of various types, such as mortar surfaces, smooth surfaces, painted surfaces, aggregate surfaces, non-aggregate surfaces, and building and finishing materials.

The foregoing objects are achieved according to a preferred embodiment of the invention, by a flat substrate which is covered with a coating which may have an aggregate such as polypropylene beads, ground up nut shells, and the like included therein to mimic the texture of the grout from which the selection process is to be made. The color, sheen and finish of the coating can accurately simulate the appearance of actual grouts. The flat substrate could have multiple score lines so that a potential customer can take one or more coated flat substrates from a dealer, fold them in three dimensions to the desired width of grout spacing required, to give the appearance of grout, and put the grout selector between two or more covering elements or next to a covering element. The grout color selector can be very inexpensive, and can be given free of charge to customers. The term "grout" is used herein, but this word can be used with similar materials which are fluid when used but later harden, and would include caulk, putty, and mortar and paint in general.

These and other objects will be apparent to those skilled in the art from the following description.

BRIEF DESCRIPTION OF THE DRAWINGS

FIG. 1 is a top plan view of a grout sample strip according to the invention.

FIG. 2 is an enlarged view of a portion of FIG. 1.

FIG. 3 is a cross section of the grout sample strip shown in FIG. 1 taken in direction 3-3.

FIG. 4 is a bottom plan view of a grout sample strip according to the invention.

DETAILED DESCRIPTION OF THE PREFERRED EMBODIMENTS

Figure 5:
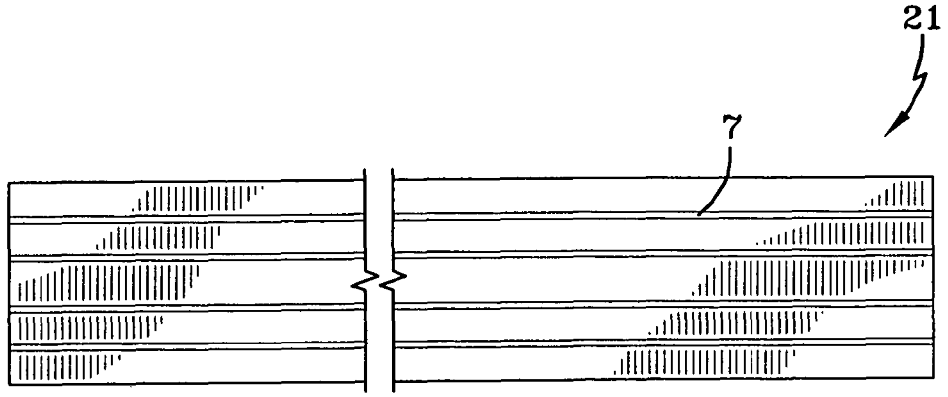
FIG. 5 is a bottom plan view of another embodiment of the invention.

Grout for securing covering elements to a support surface and each other, and caulk used on window panes and the like, and other types of mortar, in many instances should have an attractive appearance. The three aspects of this appearance are color, sheen and finish. Sheen is glossiness or reflectiveness. Sheen can be very dull with virtually no reflectance to very glossy which is very reflective. There are infinite variations between very dull and very reflective. Color refers to the chroma, hue and value of the grout or caulk. Chroma refers to saturation or the apparent purity or intensity of a color. Hue includes the respective colors such as red, blue and yellow, and the infinite variations of each color and mixture of colors. Black, white and gray lack hue. Value is the lightness or darkness of any given color. Finish refers to the texture of the grout. Finish can vary from being very smooth having a glass-like appearance, to very rough appearing as if rough sand were included in the grout. There are infinite variations between very smooth and very rough. In the grout color, sheen and/or finish selector (sometimes referred to as a color selector) described below, the color, sheen and finish of any variety of grouts and other mortars are precisely mimicked in a form which makes the selection process quite accurate since the size of the grout color selector enables one to envision how the grout will look when applied over the entire area in which the grout is to be used.

Turning now to the figures, FIG. 1 shows a grout color selector 1, a portion of which has been omitted. Grout color selector 1 is made of a base or substrate 3 having a coating 5. Substrate 3 is preferably a cellulosic material such as paper in the thickness from 0.004 to 0.016 inches, or a polymeric material such as coated polypropylene or polyethylene terephthalate. Paper preferably has a thickness in the range of 0.005 to 0.015 inches (with 0.006 to 0.012 inches being most popular) has been found to work very well. Substrate 5 is preferably a coating, which could be a solvent-borne coating, a latex composition or ultraviolet ("UV") curable coating. The solvent-borne coating can be a cellulose-derivative resin, such as nitrocellulose, cellulose acetate, ethyl cellulose, or cellulose acetate butyrate, and one or more organic solvents such as acetone, methyl ethyl ketone, methyl acetate, methanol, ethanol and/or nitromethane. A suitable latex composition includes one or more acrylic resins dispensed in an aqueous medium. If the substrate is composed of a cellulosic material, its first colored coating composition is preferably a solvent-borne coating composition. A latex composition may be used with a cellulosic substrate, and the cellulosic substrate should be sized to seal its pores against the water in the latex composition. The nitrocellulose lacquer coating is advantageous in that it dries quickly and doesn't soak into the substrate. The UV coating is equally advantageous in that it dries immediately upon exposure to the proper waveband of UV radiation.

The coating in most instances has an aggregate finish, and this is done with an aggregate such as polypropylene pellets or beads, or the like. The beads are mixed with the lacquer coating. The beads have a thickness (or diameter) in the range of 60 μm to 400 μm. The texture of coating 5 depends in part on the size of the beads, and in part with the percent they form the lacquer coating. For most uses, the percentage falls within the range of from 3% to and including 10%. The rough texture of coating 5 is shown stylistically in FIGS. 1, 2, 3, 5 and 6-8, and might not be very apparent in an actual product, or be so apparent with some colors.

The flexibility of the present invention makes variations of the aggregate on a single selector convenient. Thus, a single selector could have varying amounts of aggregate and varying sizes of the aggregate, to help determine the type of finish required in the grout or other mortar.

Substrate 3 must be folded into three dimensions when it is to be used to select the type of grout for a given job. This is accomplished by making at least a pair of horizontal fold lines along substrate 3. This is preferably accomplished with a set of scores 7 which can be done on substrate 3 with conventional scoring machines. The score is preferably a reverse score, which does not break the surface shown in FIG. 1. However, scores 7 go quite deep into substrate 3, and could form a slight rise or protrusion 9 on each score 7. The width of scores 7 is shown in exaggerated in FIG. 4, and could have a U-shaped configuration as shown in FIG. 3. The underside 11 of grout color selector 1 need not be coated, and is not shown as being coated in FIGS. 4 and 6. Other types of scoring could be used such as perforations, separated slits, producing the substrate with thinned lines and the like. The invention also includes a variation by adding additional score lines so that substrate 3 could be folded as explained below in different widths. FIG. 5 shows a grout color selector 21 having four score lines 7, which will be discussed further below.

Figure 6:
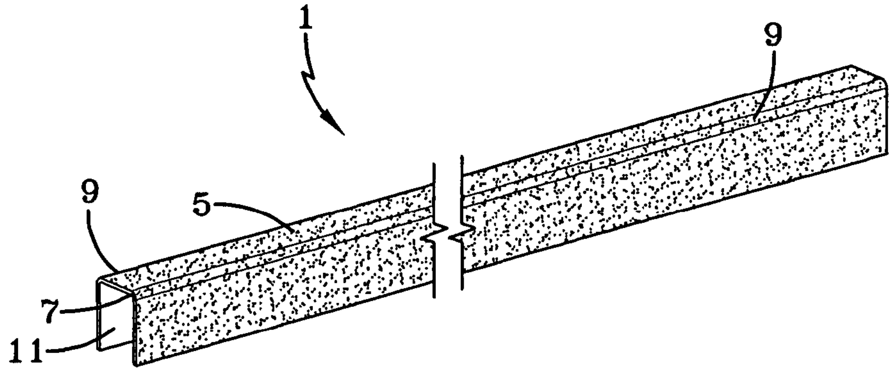
FIG. 6 is a perspective of a grout color selector strip shown in FIGS. 1-4 folded for use.
Figure 7:
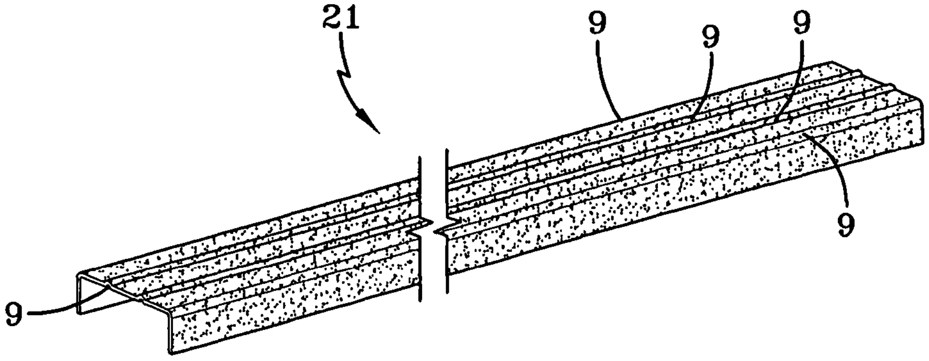
FIG. 7 is a perspective view of a grout color selector according to FIG. 5 folded for use

If a customer takes one or more grout color selectors for use in selecting a grout, the customer would simply take the scored grout color selector, in the flat form as shown in FIGS. 1, 4, and 5. When grout color selector 1 is to be used, it is folded manually into the folded form as shown in FIG. 6, and placed adjacent to covering elements to see how it appears as depicted in FIG. 8.

Figure 8:
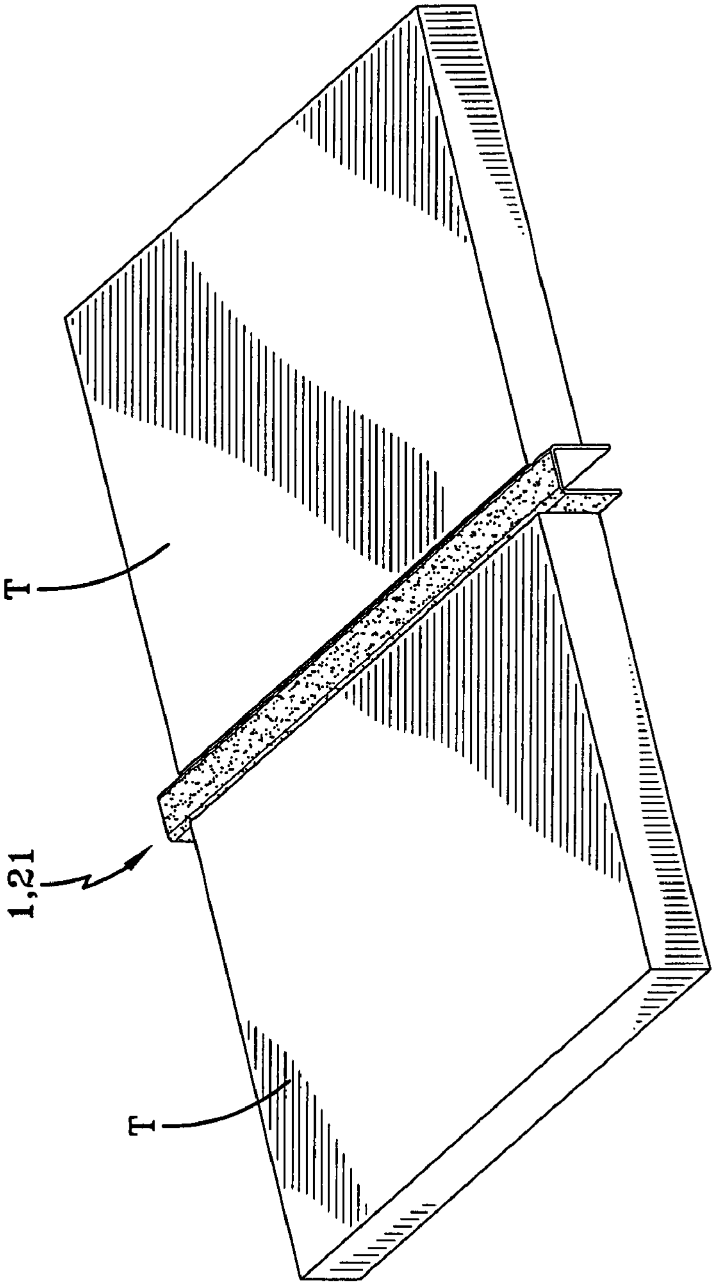
FIG. 8 is a perspective view of a grout color selector according to the invention in use.

Referring to FIG. 8, a pair of covering elements such as tiles T are shown. Tiles T have a particular color, sheen and finish. The customer may take a variety of grout color selectors 1 and/or 21, and fold them along score lines 7, and place them sequentially between tiles T. The flat grout color selectors 1, 21 are folded in three dimensions so that they are at expected height of the grout when it is to be exposed between tiles T, so that an appropriate grout can be selected. As mentioned earlier, grout color selectors according to the invention can be made very inexpensively on conventional machines with relatively minor modifications. Grout color selectors can be stacked, possibly automatically, bagged and shipped to the grout dealer. The coverings can be for standard grout types or custom made, using pigments that can be identical to those used in the particular grouts.

The present invention makes it easy to put identifying information about the color, sheen and/or finish of the substrate on the reverse side of the selector, something that was not possible to do with conventional grout selectors. This information could identify each of the color, and/or finish of the substrate, instructions for use, company identification, ordering information and the like.

It was explained above that the cellulosic or latex coatings or UV coatings can be mixed with beads to mimic the textures of the grout. The invention further covers alternatives such as embossed substrates to also mimic the texture. It is also within the scope of the invention to use printed substrate rather than coating the substrate.

While the foregoing description related primarily to grout, it can be used in many other applications for selecting the color, sheen and/or finish of various characteristics of many surfaces. These surfaces could be rough or smooth, aggregate or non-aggregate, painted, and artificial or natural.

The invention has been described in detail, but variations and modifications may occur to those skilled in the art to which the invention pertains

We claim:

1. A grout selector comprising:

a flat substrate having opposing surfaces;

a coating on at least one of the surfaces of said substrate or being said substrate, said coating having a color replicating a color of a type of grout; and fold lines in said substrate for enabling the coated substrate to be placed between adjacent coverings to simulate grout between the coverings for observation by a viewer to decide if the replicated color is acceptable.

2. A grout selector according to claim 1 where there are at least two fold lines configured when folded for the grout selector to be placed between the adjacent coverings to simulate grout between the coverings.

3. A grout selector according to claim 1 wherein the coverings are generally rectangular in configuration, and said fold lines are straight parallel lines.

4. A grout selector according to claim 1 wherein there are more than two fold lines, said substrate being foldable about different selected pairs of fold lines to vary the width of the folded substrate.

5. A grout selector according to claim 1 and further comprising a selected aggregate on said coating for simulating one of the finishes of a grout available for selection.

6. A grout selector according to claim 5 wherein the aggregate is beads.

7. A grout selector according to claim 6 wherein said beads are polypropylene beads having a thickness in the range of 60 μm to 400 μm.

8. A grout selector according to claim 5 wherein said aggregate is selected from the group consisting of beads and ground up nut shells.

9. A grout selector according to claim 1 wherein the substrate is a cellulosic material.

10. A grout selector according to claim 9 wherein the cellulosic material is paper having a thickness in the range of 0.004 inches to 0.016 inches.

11. A grout selector according to claim 1 wherein the substrate is a polymeric material.

12. A grout selector according to claim 11 wherein the polymeric material is selected from one of the group consisting of polypropylene and polyethylene terephthalate.

13. A grout selector according to claim 1 wherein said substrate is a solvent-borne coating.

14. A grout selector according to claim 13 wherein the solvent-borne coating is a cellulose-derivative resin.

15. A grout selector according to claim 14 wherein said cellulose-derivative resin is selected from the group consisting of nitrocellulose, cellulose acetate, ethyl cellulose and cellulose acetate butyrate, and one or more solvents selected from the group consisting of acetone, methyl ethyl ketone, methyl acetate, methanol, ethanol and nitromethane.

16. A grout selector according to claim 1 wherein said coating is a latex composition.

17. A grout selector according to claim 16 wherein said latex composition includes at least one acrylic resin dispensed in an aqueous medium.

18. A grout selector according to claim 1 wherein said substrate is a cellulosic material, and said coating is a solvent-borne colored coating composition.

19. A grout selector according to claim 1 wherein said substrate is cellulosic having pores, said coating is a latex composition and the pores are sealed against water in the latex composition.

20. A grout selector according to claim 1 wherein said coating is selected from the group consisting of a nitrocellulose lacquer coating and a UV coating cured with a selective waveband of UV radiation.

21. A grout selector according to claim 1 wherein said substrate is prepared for shipping in a flat condition, for ultimate folding by a user of said grout selector.

22. A grout selector according to claim 1 wherein said fold lines are selected from the group consisting of a set of scores, a set of reverse scores, U-shaped scores, perforations, separated slits and thin indented lines.

* * * * *